United States Patent [19]
Gronner et al.
[11] 3,831,168
[45] Aug. 20, 1974

[54] BINARY CODED DECIMAL-SYNCHRO CONVERTER

[75] Inventors: Alfred D. Gronner, White Plains, N.Y.; Lousi Deleo, Totowa, N.J.
[73] Assignee: The Singer Company, Little Falls, N.J.

[22] Filed: June 6, 1973
[21] Appl. No.: 367,502

[52] U.S. Cl. ..... 340/347 SY, 235/197, 340/347 DA
[51] Int. Cl. ..... H03k 13/02
[58] Field of Search ..... 340/347 SY, 347 DA; 235/197

[56] References Cited
UNITED STATES PATENTS
3,662,379 5/1972 Miller et al. ..... 340/347 DA
3,728,719 4/1973 Fish ..... 340/347 DA
3,744,050 7/1973 Hedrick ..... 340/347 DA

*Primary Examiner*—Malcolm A. Morrison
*Assistant Examiner*—Vincent J. Sunderdick
*Attorney, Agent, or Firm*—T. W. Kennedy

[57] ABSTRACT
An improved system is provided for converting binary coded decimal information into synchro signals. The system responds to binary coded decimal signals representing the more significant digits of unknown two-digit decimal numbers to obtain coarse values of the corresponding synchro signals, and it also responds to binary coded decimal signals representing the lesser significant digits of the two-digit decimal numbers to interpolate between the coarse values of the synchro signals.

5 Claims, 2 Drawing Figures

BINARY CODED DECIMAL-SYNCHRO CONVERTER

BACKGROUND OF THE INVENTION

Rotating devices providing angular information are widely used in computer systems. Typical of such devices now in common use are synchros and resolvers. These devices generate alternating current analog signals representing the sine and cosine of an angle. The synchro in its simplest form comprises a transformer having a primary and a Y-shaped secondary winding. One winding of the transformer is movable with respect to the other in response to some angular motion or information. The angular displacement between the primary and secondary windings of the transformer provides alternating current analog output signals whose amplitudes are representative of the sine and cosine of the angles between the Y-shaped secondary and primary windings.

In present day read-out systems for aircraft, simulators, and other control systems, it is often necessary to convert binary coded decimal signals representative of two-digit decimal numbers into corresponding synchro signals, and it is important that the synchro signals be accurate to at least ±1.8°. With such a system, synchro repeaters can be provided which indicate the numbers accurately, for example, on a 0–100 scale. Such systems find particular utility, for example, in distance indicating equipment for aircraft use. The present invention provides a simple and inexpensive system for converting two-digit decimal numbers, represented, for example, by binary coded decimal signals, into corresponding synchro signals capable of operating synchro repeaters, and the like.

The system of the invention uses binary coded decimal information representing the more significant digit of a two-digit decimal number to obtain a coarse positioning of the synchro, and it uses binary coded decimal information representing the lesser significant digit of the two-digit number, to interpolate between the coarse values, as mentioned above. The system is such that the output synchro signals do not deviate from their true values by more than a few percent, this being important since greater deviations would have a tendency to set up circulating currents in the synchro repeater, or other device, driven by the system.

DETAILED DESCRIPTION OF THE ILLUSTRATED EMBODIMENT

Figure 1:
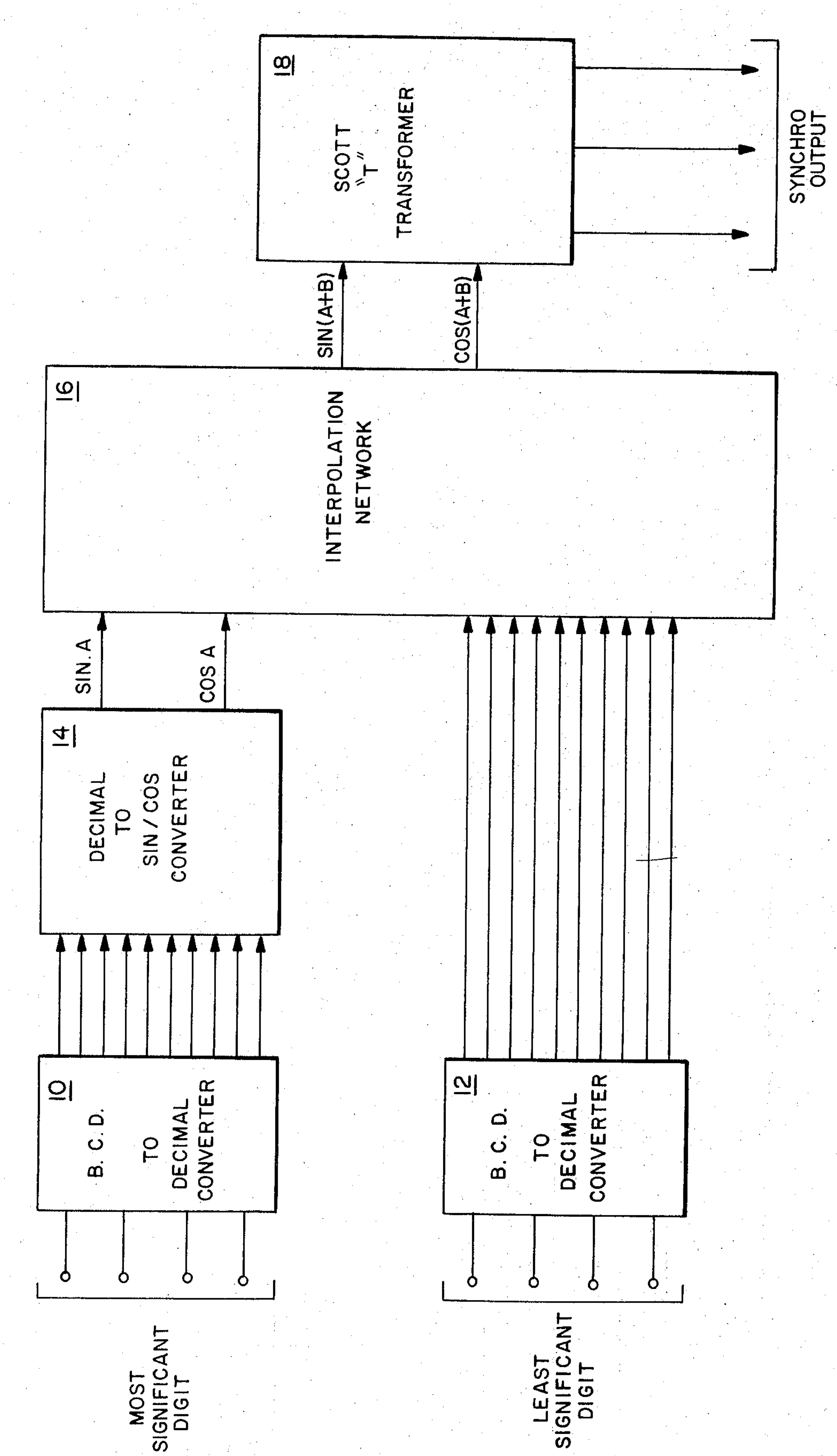
FIG. 1 is a block diagram of a binary coded decimal-synchro converter system constructed in accordance with one embodiment of the invention.

The system of FIG. 1 includes a first binary coded decimal-decimal converter network 10 and a second binary coded decimal-decimal converter network 12. The converter networks 10 and 12 are known, and each responds to an input binary coded decimal signal to provide an output at one of its 10 output terminals corresponding to the decimal number represented by the particular binary coded decimal input. The binary coded decimal signal corresponding to the more significant digit of the two-digit decimal signals to be converted into corresponding synchro signals is applied to the converter 10, and the binary coded decimal signal representative of the lesser significant digit are applied to the converter 12.

The outputs of the converter 10 are introduced to a decimal-sin/cos converter 14 which, in a manner to be described, converts the inputs into a pair of synchro signals representing respectively sin A and cos A. These latter signals are applied to an interpolation network 16, as are the outputs of the converter 12. The interpolation network 16 uses the outputs from the converter 12 to interpolate between the coarse values of the sin A and cos A synchro signals to produce more precise synchro signals designated sin (A+B) and cos (A+B). The latter signals are applied to a Scott "T" transformer represented by the block 18. The Scott "T" transformer is known to the art, and it serves to transform the sin (A+B) and cos (A+B) signals into the usual three-phase signals for synchro operation.

As the binary coded decimal input applied to the converter 10 varies from step-to-step, the angles represented by the alternating current voltages generated by the converter 14 in the form of the sin A and cos A signals vary in steps of 36°. The angles of the sines and cosines of the angles for the more significant digits are shown by the following table:

| BCD DIGITAL INPUT | EQUIVALENT SYNCHRO ANGLE | SINE VALUE | COSINE VALUE |
|---|---|---|---|
| 0000 | 0° | 0 | 1 |
| 0001 | 36° | .5878 | .8090 |
| 0010 | 72° | .9511 | .3090 |
| 0011 | 108° | .9511 | –.3090 |
| 0100 | 144° | .5878 | –.8090 |
| 0101 | 180° | 0 | –1 |
| 0110 | 216° | –.5878 | –.8090 |
| 0111 | 252° | –.9511 | –.3090 |
| 1000 | 288° | –.9511 | .3090 |
| 1001 | 324° | –.5878 | .8090 |

Figure 2:
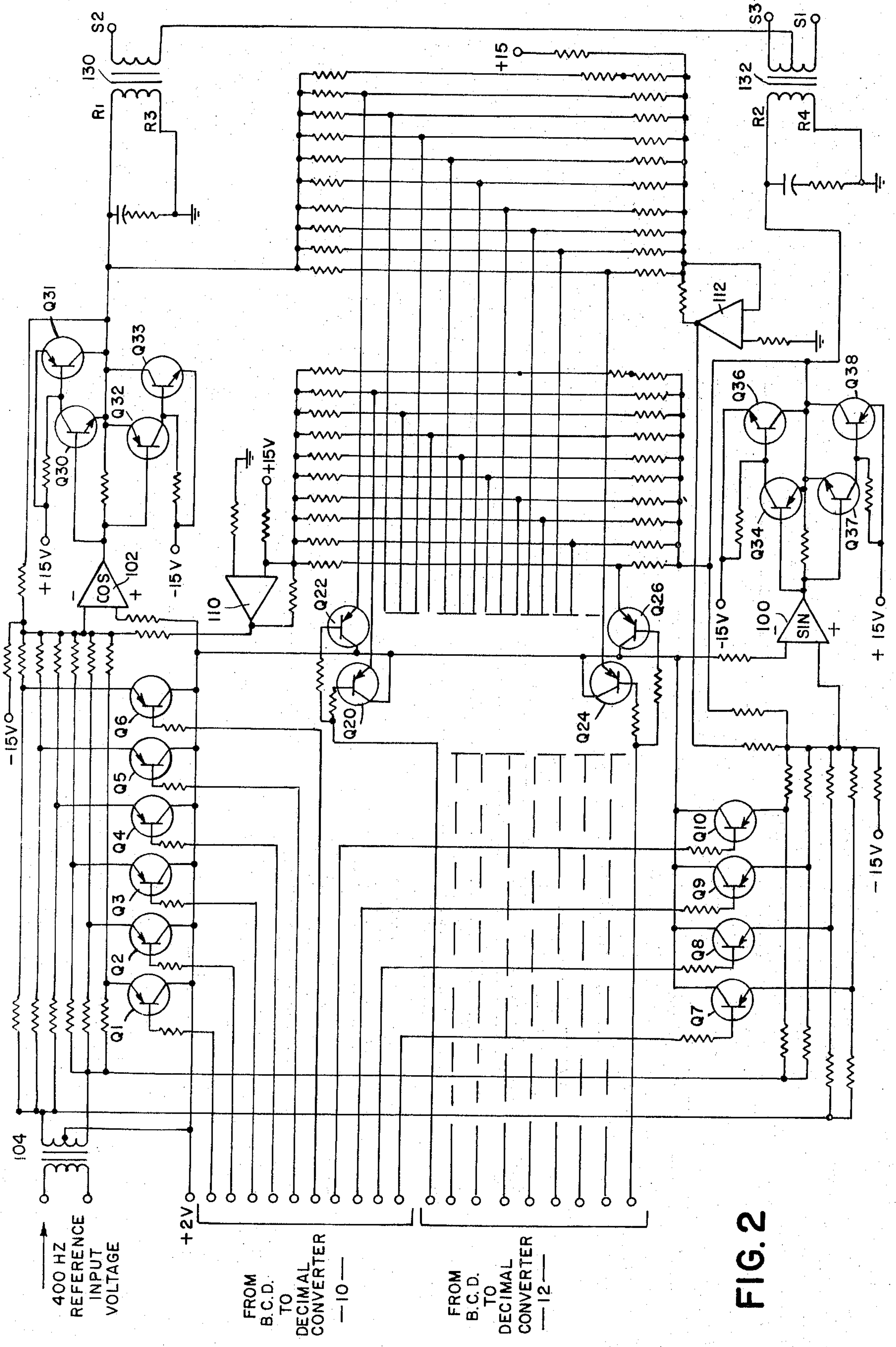
FIG. 2 is a schematic circuit diagram of the system of FIG. 1.

Then, as the binary coded decimal input numbers corresponding to the more significant digit change for each 36° angle shift of the input information, the corresponding sine and cosine information for the coded angle is switched to appropriate amplifiers, designated 100 and 102 in FIG. 2, at whose outputs the corresponding alternating current voltages representing the sin (A+B) and cos (A+B) signals appear.

In FIG. 2, an input transformer 104 is connected to a source of an appropriate alternating current input voltage having a frequency, for example, of 400 Hz. This transformer supplies the alternating current inputs to both the sine and cosine amplifiers 100 and 102. A plurality of resistor pairs are connected in circuit with the secondary of the transformer 104 and the amplifiers 100 and 102, and the resistor values of these pairs are weighted to provide the input voltages shown in the above table to the sine and cosine amplifiers 100, 102. The input signals from the decimal converter 10 are connected to respective switching transistors Q1–Q10, and for any input requirement, all of the switching transistors are shorted out except the ones associated with the proper values of sine and cosine inputs to the amplifiers.

The circuit thus far described causes the amplifiers 100 and 102 to provide outputs representative respectively of the sine and cos of the coarse angle A. For more precise representation, the signals from the converter 12 provide additional switching functions to introduce additional input to the amplifiers 100 and 102 approximating the addition of a coarse and fine angle (A+B). In this way, the 36° sine and cosine inputs to the amplifiers 100 and 102 are modified by the addition of correction voltages proportional to the 3.6° steps of the binary coded decimal input.

The signals from the converter 12 are introduced to a bank of switching transistor pairs, such as the transistors Q20, Q22 and Q24, Q26, and other transistor pairs, not shown. The transistor pairs control the switching of properly weighted resistors which, in turn, control the input to additional amplifiers 110 and 112. The amplifier 110 serves to modify the input to the cosine amplifier 102, whereas the amplifier 112 serves to modify the input to the sine amplifier 100.

It will be appreciated that the amplifiers 100 and 102 are feedback amplifiers with the needed power output. It should also be noted that two banks of resistors are controlled by the aforesaid transistor pairs, one bank being controlled to connect the output of the sine amplifier 100 to the input of the cosine amplifier 102 through amplifier 110; and the other bank serving to connect the output of the cosine amplifier 102 through the amplifier 112 to the input of the sine amplifier 100.

The resistor banks, and associated switching transistors and amplifiers 110 and 112 feed part of the sine amplifier output into the cosine amplifier input, and part of the cosine amplifier output into the sine amplifier input. The magnitude of the cross-coupled signals is determined by the binary coded decimal input to the converter 12. The circuit is set up to approximate the sine and cosine of the sum of the two angles (A+B).

If it is assumed that the inputs to the converter 10 are "units" inputs represented by the angle A, as listed in the aforesaid table in 36° steps, then the sin A and cos A signals are accurately provided by the network switched by the switching transistors Q1–Q10. If it is also assumed that the inputs to the converter 12 are "tenths" inputs represented in 3.6° steps, then angle B is the "tenths" input applied to the cross-coupling network switched by the transistor pairs such as the transistors Q20, Q22 and Q24, Q26.

The output of the sine amplifier 100 can then be expressed as:

$$E_1 = \mathrm{SIN}\ A + BK_2\ \mathrm{COS}A/1 - K_1\ K_2\ B^2 \qquad 1.$$

and the output of the Cosine amplifier can be expressed as:

$$E_2 = \mathrm{COS}A + BK_1\ \mathrm{SIN}\ A/1 - K_1\ K_2\ B^2 \qquad 2.$$

Where:

A is the angle (in radians) of the unit steps,
B is the angle (in radians) of the tenth steps,
$K_1 = 1,$
and
$K_2 = -1.$ For accuracy of the synchro angle, the ratio of the sine to cosine is more important than the individual values since:

$$\sin\ (A+B)/\mathrm{Cos}\ (A+B) = \tan\ (A+B) \qquad 3.$$

then:

$$\sin A + BK2\ \cos A/\cos A + BK1\ \sin A = \tan\theta \qquad 4.$$

The logic switching network driven by the transistor pairs, such as the transistors Q20, Q22 and Q24, Q26 produces a voltage $CE_1$ or $CE_2$ at its output, where C is a function of the second digit at the input. Two cases will now be investigated. The first case will be where C is equal to the second digit input in radians, and the second case will be where C is equal to tan B. It will be shown that C = tan B produces an exact solution.

Setting up the equations for the circuit of FIG. 2 gives:

$$E_1 = +\sin A + CE_2 \qquad 5.$$
$$E_2 = +\cos A - CE_1 \qquad 6.$$
$$E_1 = +\sin A + (\cos A - E_1\ C)\ C \qquad 7.$$
$$E_1\ (1+C^2) = +\sin A + C\cos A \qquad 8.$$
$$E_2 = +\cos A - C\sin A - E_2\ C^2 \qquad 9.$$
$$E_2\ (1+C^2) = +\cos A - C\sin A \qquad 10.$$

As only the ratio of $E_1/E = \tan$ ¼ is determining the accuracy of the synchro reading, we compute:

$$\tan\theta = E_1/E_2 = \sin A + C\cos A/\cos A - C\sin A = \tan A + C/1 - C\tan A \qquad 11.$$

Therefore the error due to the approximation for C, (taking linear angle in radians ($C=B$) is:

$$E = (\tan A + B^{rad}/1 - B^{rad}\tan A) - \tan\ (A+B) \qquad 12.$$

Using the identity $$\tan\ (A+B) = \tan A + \tan B/1 - \tan A\ \tan B \qquad 13.$$

It can be seen that, if the switching network is made to give: $C = \tan B$, instead of a linear function, then the error becomes:

$$E = (\tan A + \tan B/1 - \tan B\ \tan A) - \tan\ (A+B) = 0 \qquad 14.$$

The sine and cosine outputs from the amplifiers 100 and 102 drive a Scott "T" transformer designated 130, 132 to provide the desired three wire synchro output. The amplifiers 100, 102 are integrated circuit operational amplifiers, and they are combined with power transistors, such as the transistors Q30–Q38 to have a peak current drive capability, for example, of 3 amperes. High current capability is necessary when the synchro load is a torque repeater. Since the amplifiers must be capable of high current operation, the power supply must have a similar high current rating.

The invention provides, therefore, an improved and relatively simple system for converting binary coded decimal information into corresponding synchro signals. It will be appreciated that although a particular embodiment of the invention has been shown and described, modifications may be made. It is intended in the following claims to cover the modifications which come within the spirit and scope of the invention.

What is claimed is:

1. Apparatus to convert two sets of decimal inputs representing the magnitude of an angle, a first representing increments of one-tenth of a maximum angle and the second representing increments of one-one hundreth of a maximum angle, into two a-c output signals having magnitudes representing the sine and cosine of the angle comprising:

a. means to convert the first decimal input into first and second intermediate signals representing respectively, the sine and cosine of the angle represented by the first decimal input;
b. a first summing amplifier having said first intermediate signal as one input;

c. a second summing amplifier having said second intermediate signal as one input;

d. a first resistor attenuation network coupling the output of said first amplifier to the input of said second amplifier and responsive to the second decimal input to multiply the output of said first amplifier by one of the angle represented by said second decimal input in radians and the tangent of said angle; and e. a second similar network coupling the output of said second amplifier to the input of said first amplifier and similarly responsive to said second decimal input to negatively multiply the output of said second amplifier by one of the angle represented by said second decimal input in radians and the tangent of said angle.

2. Apparatus according to claim 1 wherein each of said resistor networks comprises a plurality of pairs of series connected resistors with all the series pairs in parallel and a plurality of switching transistors having a switching terminal coupled to the respective junctions of each series pair of resistors and having another switching terminal coupled to a reference potential, said transistors having their respective control terminals coupled to respective ones of said second decimal input.

3. Apparatus according to claim 2 wherein said means for converting said first decimal number into sine and cosine signals comprises:

a. a transformer having a reference input voltage;

b. a plurality of pairs of resistors coupling the output of said transformer to said first and second amplifiers; and c. a plurality of transistor switches respectively, each having one of their switching terminals coupled to a junction of one of said pairs of resistors with their other switching terminals coupled to a fixed potential and their respective control terminals coupled to respective ones of said first decimal input.

4. Apparatus according to claim 3 wherein representations of the tenths and hundreths of said angle are available in binary coded decimal form and further including first and second binary coded decimal to decimal decoders to provide said first and second decimal inputs.

5. Apparatus according to claim 4 and further including a Scott T transformer coupled to the outputs of said first and second amplifiers for converting said outputs into a three wire synchro output.

* * * * *